US008120894B2

(12) United States Patent
Zavidniak et al.

(10) Patent No.: US 8,120,894 B2
(45) Date of Patent: Feb. 21, 2012

(54) COMMUNICATION SYSTEM AND METHOD EMPLOYING LINE REPLACEABLE EQUIPMENT RACKS ON AN AIRCRAFT

(75) Inventors: Martin P. Zavidniak, Carlsbad, CA (US); Dale J. Shabra, San Diego, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 570 days.

(21) Appl. No.: 12/015,872

(22) Filed: Jan. 17, 2008

(65) Prior Publication Data

US 2009/0184574 A1 Jul. 23, 2009

(51) Int. Cl.
*H02B 1/26* (2006.01)
*H02B 1/20* (2006.01)
*H05K 5/00* (2006.01)
*B60L 1/00* (2006.01)

(52) U.S. Cl. ........ 361/624; 361/622; 361/724; 361/752; 361/644; 361/648; 307/9.1

(58) Field of Classification Search .................. 361/624, 361/622, 724, 752, 644, 648; 307/9.1
See application file for complete search history.

(56) References Cited

U.S. PATENT DOCUMENTS

| | | | | |
|---|---|---|---|---|
| 2,938,686 A * | 5/1960 | Lohstreter et al. | ......... | 244/118.1 |
| 3,541,395 A * | 11/1970 | Lucchino | ....................... | 361/693 |
| 4,089,040 A * | 5/1978 | Paulsen | ........................ | 361/691 |
| 4,153,225 A * | 5/1979 | Paulsen | ....................... | 244/118.1 |
| 4,422,180 A * | 12/1983 | Wendt | .......................... | 398/110 |
| 4,549,602 A * | 10/1985 | Espinoza | ..................... | 165/80.2 |
| 4,551,632 A * | 11/1985 | Jourdan et al. | ................ | 307/9.1 |
| 4,967,096 A * | 10/1990 | Diemer et al. | ................. | 307/19 |
| 5,459,474 A * | 10/1995 | Mattioli et al. | ................ | 343/702 |
| 5,479,162 A * | 12/1995 | Barger et al. | ................. | 340/945 |
| 5,570,270 A * | 10/1996 | Naedel et al. | ............ | 361/679.46 |
| 5,570,570 A * | 11/1996 | Klas et al. | ....................... | 56/17.1 |
| 5,594,285 A * | 1/1997 | Wisbey et al. | ................... | 307/18 |
| 5,612,579 A * | 3/1997 | Wisbey et al. | ................... | 307/18 |
| 5,666,256 A * | 9/1997 | Zavis et al. | .................... | 361/115 |
| 5,810,178 A * | 9/1998 | Boette et al. | ............... | 211/86.01 |
| 5,854,904 A * | 12/1998 | Brown | ......................... | 710/100 |
| 5,936,318 A * | 8/1999 | Weiler et al. | ..................... | 307/66 |
| 5,939,800 A * | 8/1999 | Artinian et al. | ................. | 307/64 |
| 6,111,192 A * | 8/2000 | Bell et al. | ....................... | 174/384 |
| 6,473,825 B1 * | 10/2002 | Worley et al. | ................. | 710/306 |
| 6,664,656 B2 * | 12/2003 | Bernier | .......................... | 307/9.1 |
| 6,778,414 B2 * | 8/2004 | Chang et al. | .................... | 363/67 |
| 7,170,747 B2 * | 1/2007 | Muirhead et al. | ............. | 361/715 |
| 7,307,851 B2 * | 12/2007 | Dimarco | ....................... | 361/753 |
| 7,508,338 B2 * | 3/2009 | Pluymers et al. | ............. | 342/175 |
| 7,561,412 B2 * | 7/2009 | Brandt et al. | ................. | 361/616 |
| 7,634,329 B2 * | 12/2009 | Liu et al. | ....................... | 700/292 |
| 2002/0190700 A1 * | 12/2002 | Tzotzkov | ....................... | 323/266 |
| 2003/0085621 A1 * | 5/2003 | Potega | ........................... | 307/18 |

(Continued)

*Primary Examiner* — Bradley Thomas
(74) *Attorney, Agent, or Firm* — Tarolli, Sundheim, Covell & Tummino LLP (57) ABSTRACT

Systems and methods are provided for assembling a communications system on an aircraft. An intrabus, including communication lines and power lines, is detachably mounted within the aircraft. At least one intrabus interface panel provides access to the intrabus. A plurality of line replaceable equipment racks (LRERs) are preassembled prior to being loaded onto the aircraft and each includes electronic equipment affixed within the LRER and at least one rack interface panel that provides access to the electronic equipment. A plurality of cables couple the at least one rack interface panel of each LRER to the at least one bus interface panel.

21 Claims, 8 Drawing Sheets

U.S. PATENT DOCUMENTS

| | | |
|---|---|---|
| 2004/0052368 A1* | 3/2004 | Spring et al. .................... 380/52 |
| 2004/0264131 A1* | 12/2004 | Nishiyama et al. ........... 361/694 |
| 2005/0121978 A1* | 6/2005 | McAvoy ......................... 307/43 |
| 2005/0187677 A1* | 8/2005 | Walker ............................ 701/16 |
| 2006/0033663 A1* | 2/2006 | Saint Clair et al. .... 343/700 MS |
| 2006/0061213 A1* | 3/2006 | Michalko ....................... 307/9.1 |
| 2006/0077997 A1* | 4/2006 | Yamaguchi et al. .......... 370/445 |
| 2006/0082970 A1* | 4/2006 | Walz et al. .................... 361/699 |
| 2006/0112119 A1* | 5/2006 | Vian et al. ..................... 707/101 |
| 2007/0030172 A1* | 2/2007 | Bandy et al. .................. 340/945 |
| 2007/0108963 A1* | 5/2007 | Wavering et al. .......... 324/158.1 |
| 2007/0147013 A1* | 6/2007 | Robbins et al. ............... 361/759 |
| 2008/0169973 A1* | 7/2008 | Pluymers et al. ............. 342/175 |
| 2008/0217471 A1* | 9/2008 | Liu et al. ...................... 244/1 R |
| 2008/0234838 A1* | 9/2008 | Ghanekar et al. ............... 700/22 |

* cited by examiner

COMMUNICATION SYSTEM AND METHOD EMPLOYING LINE REPLACEABLE EQUIPMENT RACKS ON AN AIRCRAFT

TECHNICAL FIELD

The present invention relates to communications systems, and, more particularly, to a communication system and method employing line replaceable equipment racks (LRERs) on an aircraft.

BACKGROUND

The use of communication systems having wireless mobile communication units has become widespread. Wireless communication systems that operate within a cell or coverage area provide several important advantages over conventional wired systems. For example, wireless communication users can communicate in locations where wired service is not available or feasible, such as remote or rugged locations. Additionally, wireless communication users within the cell have much more mobility, because the units do not have to be connected to a fixed wired network. These and other favorable characteristics make wireless communications ideally suited for personal, business, military, search and rescue, law enforcement, water vehicle, and other field related applications.

Common approaches to providing wireless communication systems include two-way radio systems and cellular systems. Despite the benefits of these approaches, they have several drawbacks. First, the cell size or range of units within these systems depends, at least in part, upon the power provided to the units. Typically, disposable or re-chargeable batteries are incorporated into wireless communication devices to provide operating power to the devices. The batteries can provide different amounts of power to units, depending on the size and/or weight of the batteries. For instance, a small battery may provide on the order of 100 milliwatts to a unit, and may be compact and lightweight enough to be incorporated into a cellular telephone. However, such a small battery provides only enough power to facilitate a range of a few miles, and only for a few hours.

It is for this reason that a plurality of fixed base stations or towers need to be constructed within a couple of miles of one another to make cellular systems effective. The towers define multiple cells and serve to, among other things, receive the weak signals transmitted by cellular telephones, so as to achieve usable range even as the cell phones themselves achieve only a short range. The towers also extend the operating life of the cell phone batteries, by enabling the units to transmit at a low power level. However, such towers are expensive, and take a substantial amount of time to construct. The cost of building such base stations is not warranted in some instances, such as in extremely remote areas. And, it may not be possible or desirable to build towers at other locations, such as on battlefields or in war zones, where the communication coverage area or cell needs to remain mobile, and the towers themselves would represent vulnerable targets for the enemy. Accordingly, aircraft mounted communications systems have been implemented within aircraft to provide mobile base stations for servicing an associated coverage area.

Traditionally, airborne electronic equipment, for example, as might be utilized in an aircraft mounted communications system, is implemented aboard aircraft in a packaging style referred to as Line Replaceable Units (LRUs). The phrase "Line Replaceable Unit" refers to a black box of electronics, such as a radio or other auxiliary equipment for a complex engineered system like an airplane or ship. LRUs speed up installation and repair, because they can be installed or replaced quickly. Typically, they also reduce the cost of systems, and increase the quality, by spreading development costs of the type of unit over different models of vehicles.

In aircraft implementations, many LRUs come together to comprise a payload or the load (in this case the electronics) which the vehicle is designed to transport under specified conditions of operation, in addition to the aircrafts own unladed weight. In these instances the payload determines the operational capabilities of the aircraft. Typically these loads are oriented to missions such as surveillance or communications. As a part of the aircrafts payload, LRUs are typically mounted in aircraft equipment racks. Although these equipment racks vary in size and construction (depending on the aircraft) they uniformly provide the means to house the LRU and to secure the LRU to the aircraft. Due to the weight and size, the mounting rack is generally bolted into the aircraft before loading and integrating its intended LRUs and cables. Final integration of LRUs, are required to occur on site with the aircraft, and results in a time consuming effort. This necessary process is a burden on time and cost.

SUMMARY OF THE INVENTION

In accordance with an aspect of the present invention, a communication system assembled on an aircraft. An intrabus, including communication lines and power lines, is detachably mounted within the aircraft. At least one intrabus interface panel provides access to the intrabus. A plurality of line replaceable equipment racks (LRERs) are preassembled prior to being loaded onto the aircraft and each includes electronic equipment affixed within the LRER and at least one rack interface panel that provides access to the electronic equipment. A plurality of cables couple the at least one rack interface panel of each LRER to the at least one bus interface panel.

In accordance with another aspect of the present invention, a communications system assembled on an aircraft is provided. A first intrabus, including a first set of communication lines and a first set of power lines, is detachably mounted within the aircraft. A first intrabus interface panel provides access to the first intrabus. A second intrabus, including a second set of communication lines and a second set of power lines, is detachably mounted within the aircraft. A second intrabus interface panel provides access to the second intrabus. A plurality of line replaceable equipment rack (LRER) stations are preassembled prior to being loaded onto the aircraft and each includes electronic equipment affixed within the LRER and at least one rack interface panel that provides access to the electronic equipment. A plurality of cables couple the at least one rack interface panel of each LRER to one of the first intrabus interface panel and the second intrabus interface panel.

In accordance with yet another aspect of the present invention, a method is provided for assembling a communication system on an aircraft. A plurality of line replaceable equipment rack (LRER), each comprising electronic equipment affixed within the LRER and at least one rack interface panel that provides access to the electronic equipment, are built. An intrabus, comprising communication lines and power lines, is detachably mounted within the aircraft. Antenna lines and power lines derived from the aircraft are coupled to the intrabus. At least one intrabus interface panel is mounted to the aircraft to provide access to the intrabus. The plurality of LRERs are manually loaded onto the aircraft. The plurality of LRERs are electrically connected to the intrabus by connecting a plurality of cables to the at least one rack interface panel of each LRER the at least one intrabus interface panel.

DETAILED DESCRIPTION

In accordance with an aspect of the present invention, a communication system is provided utilizing a line replaceable equipment rack (LRER) arrangement. A line replaceable equipment rack, as used herein, comprises one or more electronic equipment modules connected to a plurality of ports in an associated rack interface panel, allowing power and data connections to be provided at a centralized location for the LRER. The LRER effectively functions as an integral unit, allowing it to be assembled and tested outside of its operating environment. This allows the LRER to be tested, for example, with stationary equipment at an off-site testing location, allowing for a significant reduction in the time and expense necessary for testing. Further, the communications system is designed to simplify connectivity between the LRERs and an intrabus within the system, rendering the LRERs effectively modular. Accordingly, in the claimed communications system, a malfunctioning or obsolete LRER can be replaced quickly and without impact to other LRERs or the infrastructure of the communications system.

Figure 1:
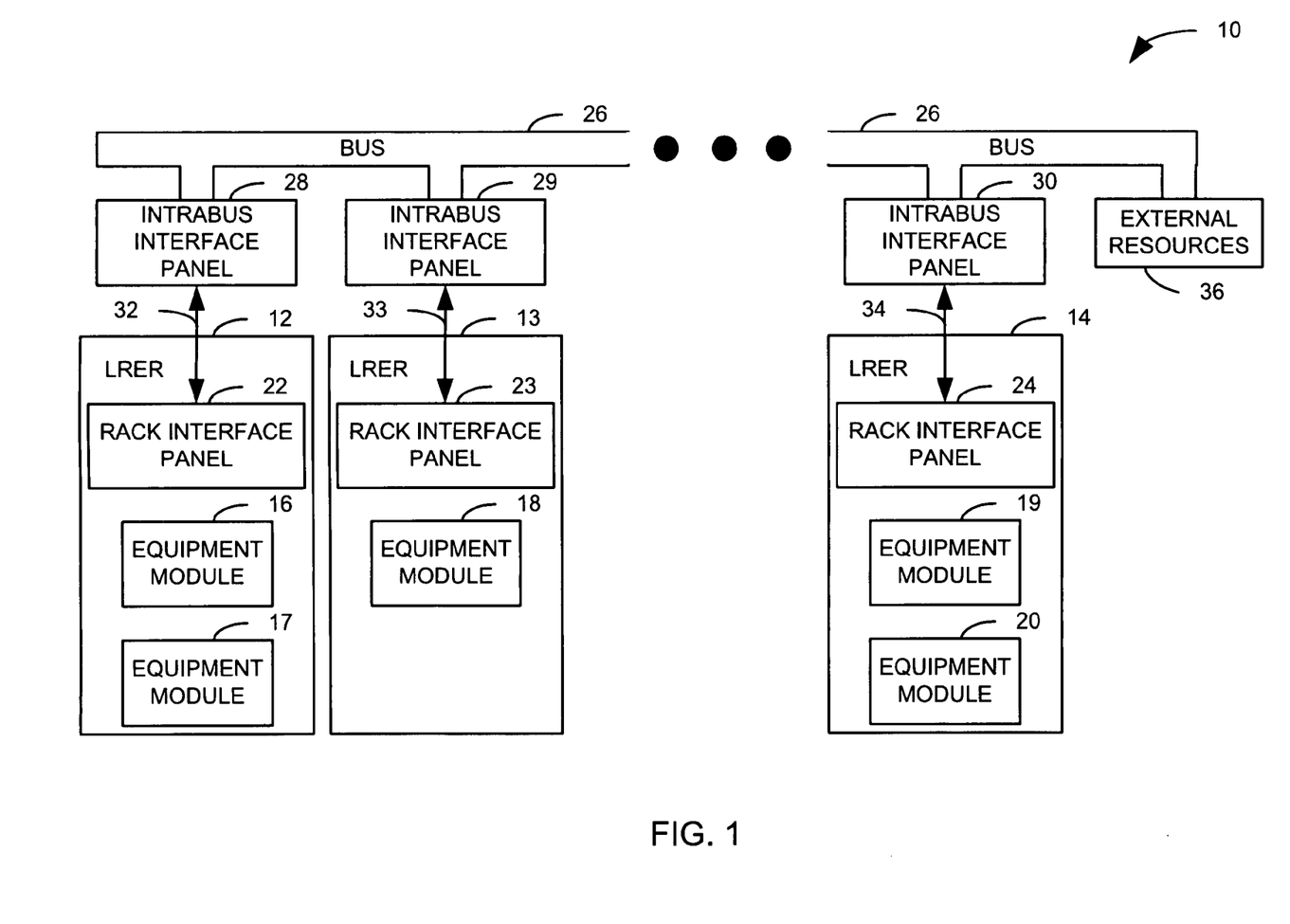
FIG. 1 illustrates a communications system assembled in an aircraft from line replaceable equipment racks in accordance with an aspect of the present invention.

FIG. 1 illustrates a communications system 10 assembled in an aircraft from line replaceable equipment racks (LRERs) in accordance with an aspect of the present invention. The illustrated interface assembly 10 includes a plurality of line replaceable equipment racks 12-14, each loaded with electronics equipment in the form of one or more electronic equipment modules 16-20 operative to perform various communications functions. Each of the electronic equipment modules 16-20 in the LRERs 12-14 can be operatively connected to a rack interface panel 22-24, such that power and data connections can be made to any of the equipment modules in a given LRER at its associated rack interface panel. Each of the LRERs 12-14 can be detachably affixed to the interior of the aircraft. In one implementation, each LRER can be secured via an L-bracket affixed to the floor of the aircraft that releasably engages a lower portion of the LRER. It will be appreciated that each LRER 12-14 can be assembled and tested, either separately or in combination with additional LRERs as a communications system, before being loaded onto the aircraft. Given the integral nature of the LRERs 12-14, each LRER can be carried by two people and manually loaded onto the aircraft.

The system 10 further comprises an intrabus assembly 26 that interconnects the plurality of LRERs 12-14 to allow for the transfer of data and power among the plurality of LRERs. For example, the intrabus assembly 22 can comprise a plurality of communications lines, such as data lines, voice lines, antenna lines, and control lines, for facilitating communication among the plurality of LRERs 12-14. In accordance with an aspect of the present invention, the intrabus 118 can be detachably affixed to the interior of the aircraft, such that the airplane can be readily converted to another purpose even after the installation of the aircraft mounted communications system. The intrabus assembly 26 can be operatively connected to a plurality of intrabus interface panels 28-30 distributed across the bulkhead of the aircraft to provide a centralized grouping of ports for accessing the intrabus assembly at various locations within the aircraft. Accordingly, in accordance with an aspect of the present invention, each of the plurality of LRERs 12-14 can be connected to the intrabus assembly 26 to form the complete communications system 10 by connecting the plurality of rack interface panels 22-24 to corresponding intrabus interface panels 28-30 within the aircraft with appropriate sets of cables 32-34 for linking corresponding ports on the panel. In additional, the intrabus assembly 26 can connect the plurality of LRERs 12-14 to external resources 36 within the aircraft, including one or more antennae and at least one power distribution unit.

Figure 2:
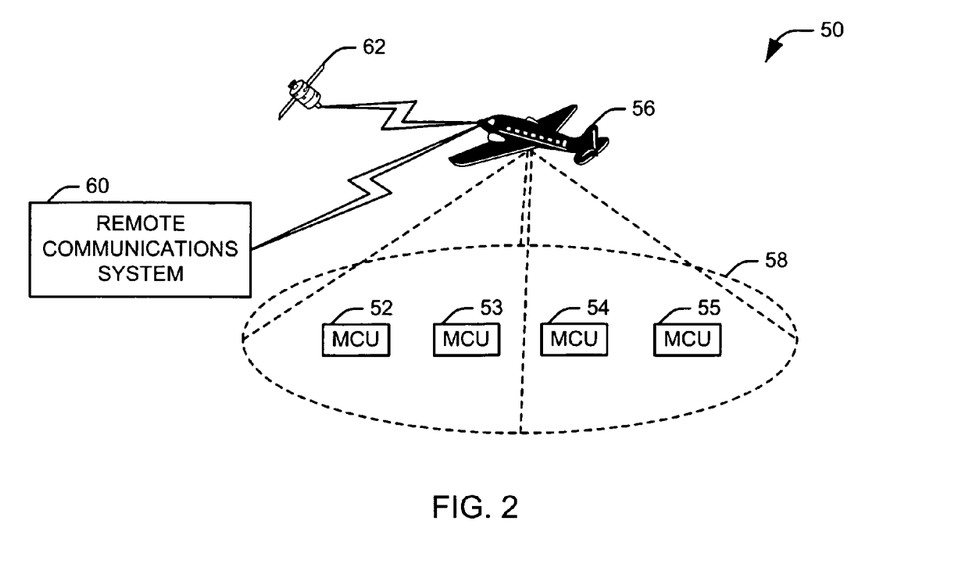
FIG. 2 illustrates a mobile communication system in which a communications system in accordance with one or more aspects of the present invention could be utilized.

FIG. 2 illustrates a mobile communication system 50 in which a communications system assembled from line replaceable equipment racks mounted within an aircraft in accordance with one or more aspects of the present invention could be utilized. The mobile communication system 50 includes a plurality of mobile communication units (MCUs) 52-55, for example, two-way radios. The MCUs 52-55 are operative to communicate with one another wirelessly, and are adapted to transmit and/or receive voice, image, and/or data information (e.g., administrative data, location data, configuration data, and priority data). The communication system 50 facilitates transmissions between MCUs at very low power requirements, thus extending the useful life of batteries in the units while also reducing the size and weight of batteries required.

The mobile communication system 50 further includes a communications system 56 assembled from LRERs on an aircraft in accordance with an aspect of the present invention and having an associated coverage area or cell range 58 of the system 50. The communications system 56 is operative to receive transmissions from a given MCU (e.g., 52) and to re-broadcast the transmissions at the same or boosted power levels to one or more other MCUs (e.g., 53-55) within the coverage area 58. In accordance with one or more aspects of the present invention, the aircraft mounted communication system 56 can follow the movement of its associated MCUs such that the entire coverage area 58 is mobile. In one implementation, an air vehicle in which the aircraft mounted communication system 56 is based can maintain an elevation less than about seven kilometers during operation. Since the aircraft mounted communication system 56 can transmit signals at an increased power level, communications from MCUs 52-55 within the coverage area 58 can be transmitted to other communication devices 60 (e.g., a home base) outside the coverage area directly, or through one or more relays 62, including mobile (e.g., mounted in a ground vehicle, watercraft, aircraft, or satellite) and/or fixed-site base units.

In one example, a message (e.g., data, voice) is provided by a mobile communication unit 52. The mobile communication unit 52 transmits an analog signal (e.g., as radio frequency electromagnetic waves) that can be received by other units within a communications range for the unit 52. The analog signal is sent to and re-broadcast by the aircraft mounted communication system 56 so as to reach the other units within the coverage area. The aircraft mounted communication system 56 can be a repeater such that the mobile base simply re-broadcasts the transmission. Alternatively, the aircraft mounted communication system 56 can be a router that provides intelligent routing to specific destination devices. Further, the aircraft mounted communication system 56 can contain various processing and data storage equipment for extracting data, such as location data, from received messages and storing the data in an associated database.

In another example, a speech pattern or voice message is provided to an input device, such as a microphone, of a mobile communication unit (e.g., 52), generally when a push-to-talk button is depressed on the unit. The message may then be converted into digitized voice data. The digitized voice data can be in the form of digitized voice packets, such as Voice-Over-Internet Protocol (VOIP) packets, Network Voice Protocol (NVP) packets, or any other form of digitized voice or digitized speech data. Identification information can be provided to the packet containing, for example, data type, data source, data destination, priority, data security, and other information. Any of a variety of encryption mechanisms, such as hashing and key pairs, can be employed to encrypt the packet for security purposes. The packets are then converted to an analog signal to be transmitted over the air. The analog signal can be modulated and transmitted over the air as modulated radio (electromagnetic) waves. The mobile communication units 52-55 can be programmed to frequency hop according to a predefined frequency-hopping scheme over N number of channels, N being an integer.

The voice signal is received by the aircraft mounted communication system 56, demodulated, and provided to a router (not shown) as digital voice data. If the voice data are transmitted with a frequency-hopping scheme, a receiver at the aircraft mounted communication system 56 can employ the same frequency-hopping scheme. The digital data can be decrypted and converted back to digitized voice packets. The router reads the packets to determine the intended destination of the voice data, in addition to other overhead and identity information with respect to the voice data. The aircraft mounted communication system 56 then retransmits the signal at an increased power level to the appropriate recipient(s), pursuant to the identity information. The intended recipients can include communications systems within the coverage area 58 of aircraft mounted communication system 56 or one or more communications systems 60 outside of the coverage area.

Figure 3:
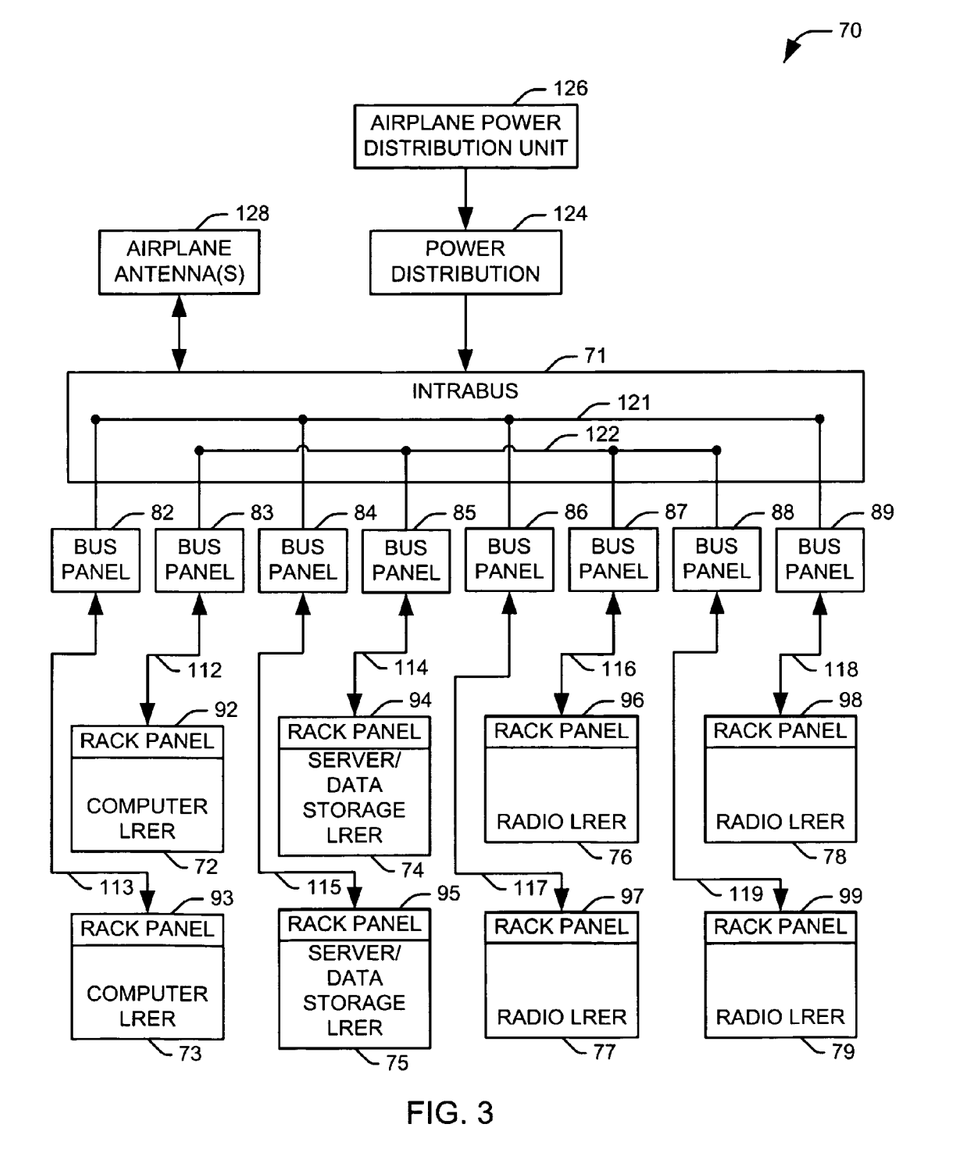
FIG. 3 illustrates a functional block diagram of an exemplary communication system implemented on an aircraft as a plurality of line replaceable equipment racks in accordance with an aspect of the present invention.

FIG. 3 illustrates a functional block diagram of an exemplary aircraft mounted communication system 70 in accordance with an aspect of the present invention. In the illustrated system 70, an intrabus assembly 71 is utilized within an aircraft to interconnect each of a plurality of line replaceable equipment racks (LRERs) 72-79 loaded communications equipment each having at least one equipment module operative to perform a communications function. In accordance with an aspect of the present invention, the intrabus assembly 71 is implemented as to be readily detachable from the aircraft, such that any plane can be quickly configured to carry the aircraft mounted communications system 70 and reconfigured for any other purpose.

In one implementation, the intrabus assembly 71 can be mechanically affixed to the bulkhead and electrically connected to a plurality of intrabus interface panels 82-89. Each of the intrabus interface panels 82-89 can comprise a plurality of ports for connecting one or more electronic components associated with each LRER to the intrabus assembly 71 with appropriate sets of cabling 112-119. In one implementation, the plurality of intrabus interface panels 82-89 are distributed across different locations on the bulkhead of the aircraft. Corresponding ports can be located on the each of the plurality of LRERs 72-79 at one or more rack interface panels 92-99 on each LRER. The configuration of the one or more rack interfaces can vary according to an associated function of the rack. In accordance with an aspect of the present invention, the LRERs 72-79 can be fully loaded with electronics modules and wired to their respective one or more rack interface panels 92-99 prior to installation within the aircraft to provide for "plug-and-play" functionality for the LRERs. It will be appreciated that the intrabus interface panels 82-89 and the corresponding rack interface panels can vary in design and function and that multiple intrabus interface panels 82-89 can be provided for each of the plurality of LRERs 72-79. For example, in one implementation, separate intrabus interface panels 82-89 can be utilized for providing power and data to the LRERs 72-79.

In the illustrated implementation, the intrabus assembly 71 can contain multiple intrabuses 121 and 122 for carrying data between the LRERs 72-79. For example, a first intrabus 121 can have dedicated communications lines that carry data associated with a first communications network having a first associated level of security and a second intrabus 122 can have dedicated communications lines carry data associated with a second communications network having a second associated level of security. In one implementation, the first intrabus is detachably mounted to a floor of the bulkhead of the aircraft and the second intrabus is detachably mounted to a mid-cabin wall of the bulkhead of the aircraft. The first intrabus 121 can be accessed through an associated first set of intrabus interface panels 82, 84, 86, and 88, and the second intrabus 122 can be accessed through an associated first set of intrabus interface panels 83, 85, 87, and 89 such that a given LRER (e.g., 72) can be assigned to a given one of the first and second communications networks by electrically connecting the LRER to an appropriate intrabus interface panel. The intrabuses 121 and 122 can be configured such that no communication is possible between a first set of LRERs 72-75 connected to the first intrabus 121 and a second set of LRERs 76-79 connected to the second intrabus 122.

The intrabus assembly 71, in addition to transmitting data, can also facilitate access to resources provided by the aircraft. For example, the intrabus assembly 71 can be connected to a power distribution unit 124 that draws power from a power distribution unit of the aircraft 126 and distributes the power to the plurality of LRERs 72-75. It will be appreciated that the power distribution unit 124 can be implemented as a separate component, for example, as a separate one of the plurality of LRERs 72-79, or the power distribution unit can be distributed across the plurality of LRERs as separate power converters at each LRER. In one implementation, multiple ports providing multiple voltages can be provided at the one or more intrabus interface panels 82-89, allowing appropriate power to be provided to the various electronics modules in the plurality of LRERs 72-79. Each of the plurality of intrabuses 121 and 122 comprising the intrabus assembly 71 can have dedicated power lines for providing power to their respective sets of LRERs. The intrabus assembly 71 can be further connected to one or more antennae 128 through antenna lines associated with the aircraft to allow for reception and transmission of radio messages by the various electronics modules at the plurality of LRERs 72-79.

In one implementation, each of the plurality of LRERs 72-79 can contain electronics modules that can be grouped into a broad functional category. For example, one or more radio LRERs 76-79 can perform radio communications functions. One or more receiver components can receive down-convert, decode, and decrypt incoming messages received at the one or more aircraft antennae 128. One or more exciter components can encrypt, encode, and upconvert messages for transmission at the one or more aircraft antennae 128. The operation of the radio LRERs 76-79 can be regulated at one or more computer LRERs 72 and 73 for the communications system 70. For example, the computer LRERs 72 and 73 can route incoming messages to an appropriate radio LRER of the plurality of radio LRERs 76-79, control the distribution of workload across the electronics modules at the radio LRERs, monitor the other system components (e.g., radio LRERs, server/data storage LRERs 74 and 75, intrabus assembly 71, etc.) for malfunction, and interpret and store data from messages receive data the aircraft antennae 128. The computer LRERs 72 and 73 also facilitate requests for stored data by other users of the communication system 70. In the illustrated implementation, each computer LRER (e.g., 72) performs control functions for an associated set of LRERs 74, 76, and 78 connected to an associated intrabus 121 of the plurality of intrabuses 121 and 122 comprising the intrabus assembly 71.

Data produced by and received at the communications system 70 can be stored at one or more server/data storage LRERs 74 and 75 containing one or more computer readable media operative to store message data from received messages, such as location information associated with the source of a message. In one implementation, a given server/data storage LRER 75 can include multiple computer readable media associated with respective intrabuses of the plurality of intrabuses 121 and 122 comprising the intrabus assembly 71. Accordingly, data having varying levels of sensitivity can be stored separately.

Figure 4:
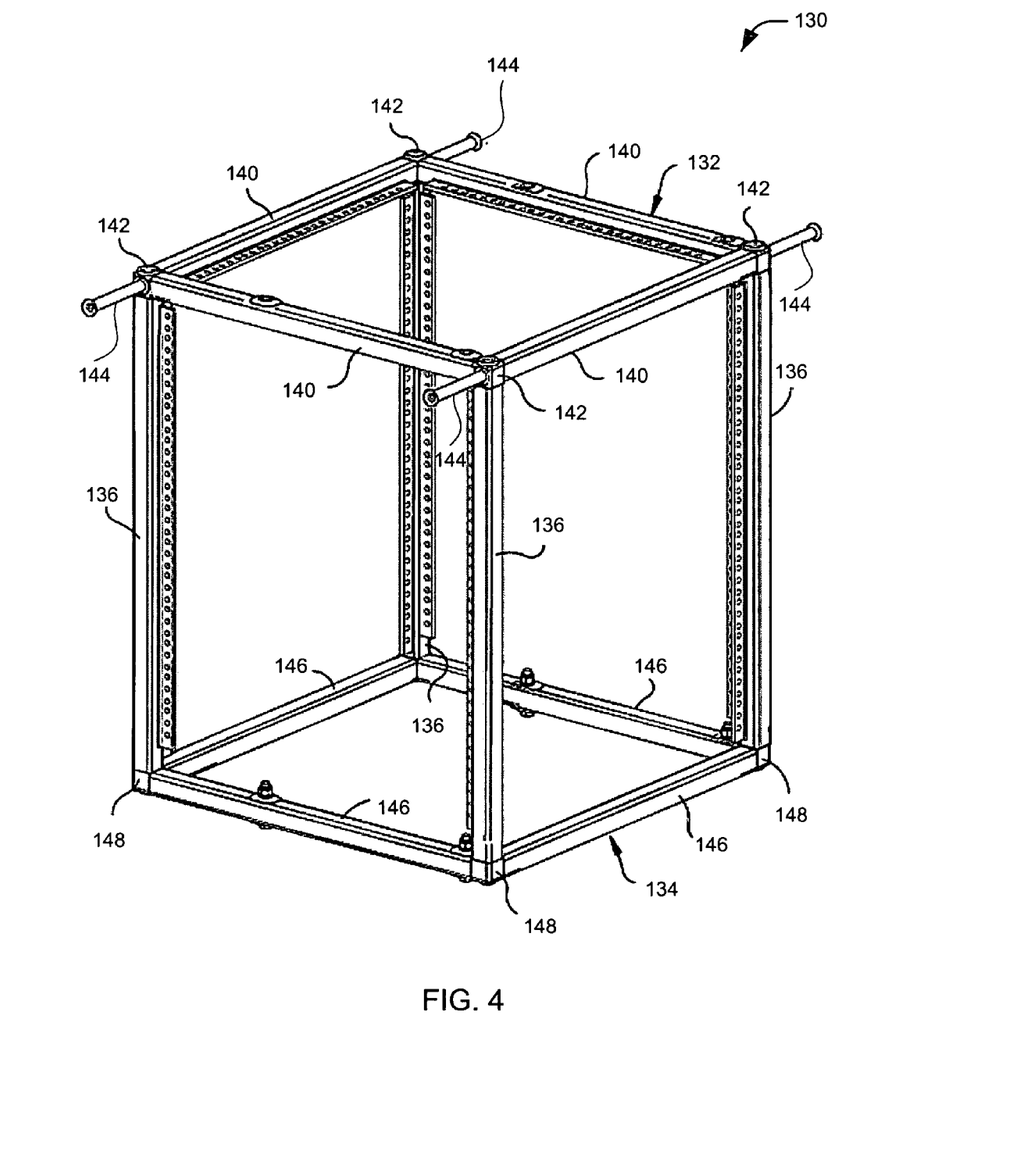
FIG. 4 depicts a modular rack that can be utilized to implement a line replaceable equipment rack in accordance with an aspect of the present invention.

FIG. 4 depicts a modular rack 130 that can be utilized as part of a line replaceable equipment rack in accordance with an aspect of the present invention. One example of a suitable rack can be found in commonly owned application Ser. No. 12/015220, entitled, "Modular Rack for Avionics Equipment", the entire contents of which is hereby incorporated herein. The modular rack 130 can be loaded with electrical equipment and manually loaded onto an aircraft or other environment other in which the equipment is potentially subject to high G loads and wide-ranging temperature fluctuations. The rack 130 includes an upper rectangular frame 132, a lower rectangular frame 134, and a plurality of struts 136 that interconnect the upper and lower rectangular frames 132 and 134. Each strut 136 connects corresponding corners of the upper and lower rectangular frames 132 and 134, though one of ordinary skill in the art could readily provide different arrangements of the struts 136 to interconnect the upper and lower rectangular frames 132 and 134. For example, a side bracing strut (not shown) may interconnect noncorner portions of the upper and lower rectangular frames 132 and 134. The struts 136 are depicted as having structures similar to each other, merely with differing orientations, but there is no requirement that the struts be matched in shape, size, orientation, configuration, or any other property.

The rack 130 could be formed in one piece or manufactured from separate components. The upper rectangular frame 132 can include a plurality of upper frame legs 140 connected by at least one upper node connector 142. In the illustrated implementation, a plurality of handles 144 can be connected to the upper node connectors 144 to facilitate carrying of the rack 130 when loaded with electronics equipment. Similarly, the lower rectangular frame 134 can include a plurality of lower frame legs 146 connected by at least one lower node connector 148. In the depicted configuration, each strut 136 extends between at least one upper node connector 142 and at least one lower node connector 148.

The upper frame legs 140 and the lower frame legs 146 may have a substantially rectangular (in this case, square) tubular cross-section. It is contemplated, however, that the legs 140 and 146 may have different sizes, shapes, configurations, cross-sections, or other properties. For example, the legs 140 and 146 can be hollow or solid, or have an L-shaped, triangular, circular, curvilinear, or polygonal cross-section of any desired size.

The lower rectangular frame 134 may include one or more support feet (not shown) configured to space the lower rectangular frame a short distance away from the underlying surface. This spacing may be useful in allowing airflow beneath the rack 130, cushioning the rack, allowing insertion of items beneath the rack, or for any other reason. When support feet are provided, it is contemplated that the number, size, configuration, and other properties of the support feet are chosen to support the rack 130 in a stable manner. One or more support feet may be adjustable to compensate at least partially for an uneven base structure beneath the rack 130. One or more support feet may also or instead include a uni- or multi-directional caster, a fixed wheel, or another low-friction feature to assist in moving the rack 130 laterally, without lifting. The support feet may be formed in one piece with one or more rack 130 components, or may be separately provided. For example, each lower node connector 148 may be molded with a protruding support foot on a lower surface (not shown) of the connector. The lower rectangular frame 134 may be configured for attachment to at least one of a base structure and another modular rack, and the upper rectangular frame 132 may be configured for attachment to another modular rack. In this configuration, when one rack 130 is stacked atop another rack (not shown), the support feet of the top rack may be configured to mate, match, or engage with one or more foot sockets (not shown) of the bottom rack to assist in relatively positioning and/or interlocking the top and bottom racks.

The rack 130 can also include at least one electrically conductive grounding path (not shown) for grounding aircraft mounted equipment mounted to the rack. This grounding path may be provided by an additional structure (not shown) attached to the rack 130 or to one or more components of the rack, or may be provided through the previously described structure of the rack itself. For example, and particularly when at least one of the struts 136, upper frame legs 140, and lower frame legs 146 are at least partially formed of an electrically conductive material, at least one of the upper and lower node connectors 142 and 148 may include an electrically conductive feature or structure (not shown), such as a conductive lining, a grounding strap, or any other suitable feature. In such case, if the upper and/or lower node connectors 142 and 148 are attached to at least one of the struts 136, upper frame legs 140, and lower frame legs 146 by at least one assembly screw, the grounding path optionally travels through the assembly screw, or another connector, fastener, or other component of the rack 130. In other words, the grounding path need not travel through structures of the rack 130 dedicated for the purpose, but could be provided entirely by material and configuration choices of the structural components of the rack 130.

Figure 5:
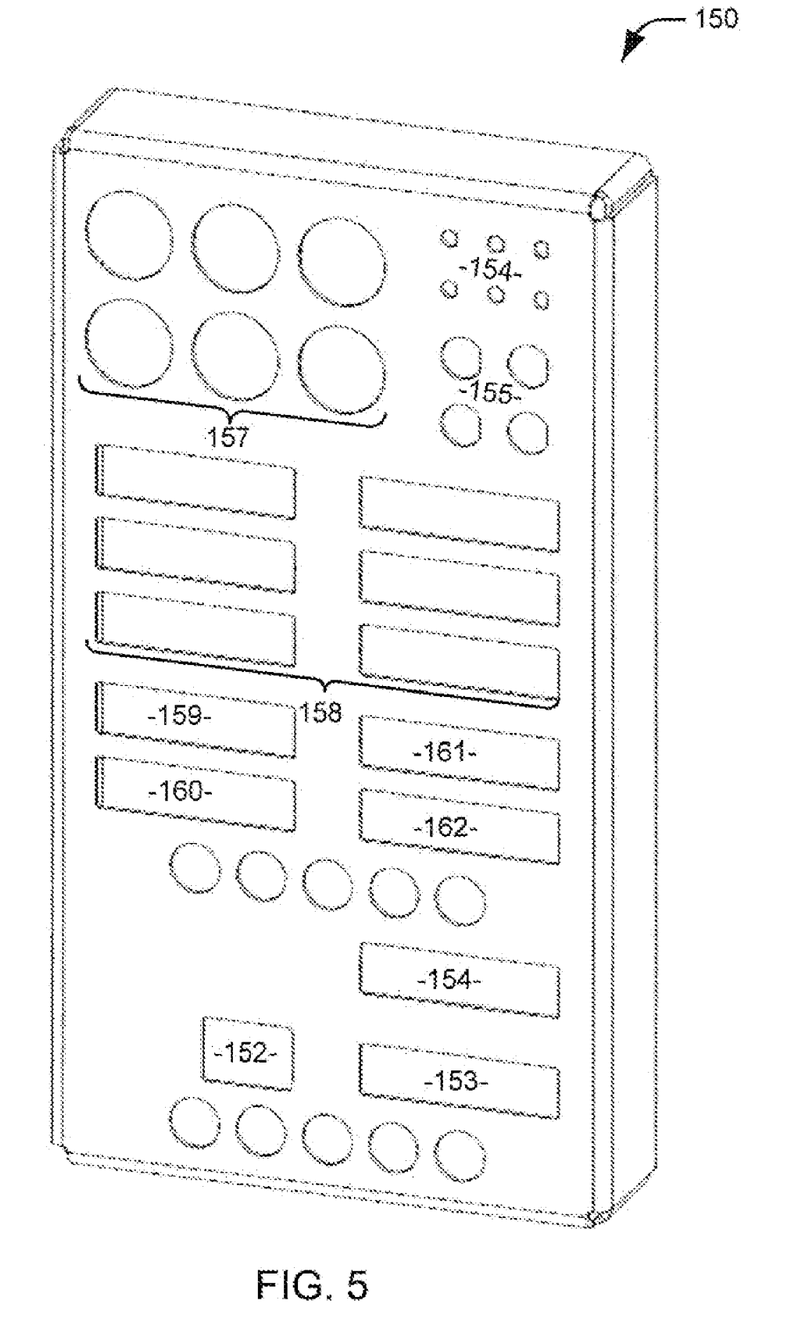
FIG. 5 illustrates an exemplary intrabus interface panel for a line replaceable equipment rack (LRER) loaded with computer processing equipment in accordance with an aspect of the present invention.

FIG. 5 illustrates an exemplary intrabus interface panel 150, as might be utilized with a line replaceable equipment rack (LRER) loaded with computer processing equipment, in accordance with an aspect of the present invention. It will be appreciated that a number of these panels, for example, individual panels for various sets of data lines as well as a power panel, can be provided at each of a plurality of rack stations implemented within an aircraft, and that the configuration of the various panels can vary. It will further be appreciated that a given aperture of the plurality of apertures 152-162 on the panel 150 can contain multiple ports for connecting different data links within the intrabus. The illustrated panel 150 includes a plurality of apertures 152-154 for accessing power ports that provide power to the electronic modules within a given rack. In the illustrated panel 150, a first aperture 152 allows access to one or more ports providing twenty-eight volts of direct current, a second aperture 153 that allows access to one or more ports providing one hundred fifteen volts of alternating current at sixty Hertz, and a third aperture 154 that allows access to one or more ports providing one hundred fifteen volts of alternating current at four hundred Hertz.

The illustrated panel 150 further comprises a set of apertures 155 that provide access to MIL-1553 serial links. Another set of apertures 156 can allow access to GPS (Global Positioning System) data, for example, from a navigation system onboard the aircraft, including both location data and accurate time of day information. A third set of apertures 157 provide access to 1000 base-T data links that can be utilized for sending data between the various racks at Gbit/s speeds. A fourth set of apertures 158 provide access to lower speed Ethernet links, such as 100 base-T and 10 base-T links. The panel 150 further includes a separate aperture 159 for providing access to one or more RS-422 links, another aperture 160 for a link that conveys voice data, and a third aperture 161 can provide one or more POTS (plain old telephone system) links. Finally, one or more spare apertures 162 can be provided, allowing for the addition of one or more additional ports from the various port types discussed herein or the inclusion of additional ports to perform other functions. Accordingly, a large variety of electronics modules can be accommodated by a given intrabus interface panel.

Figure 6:
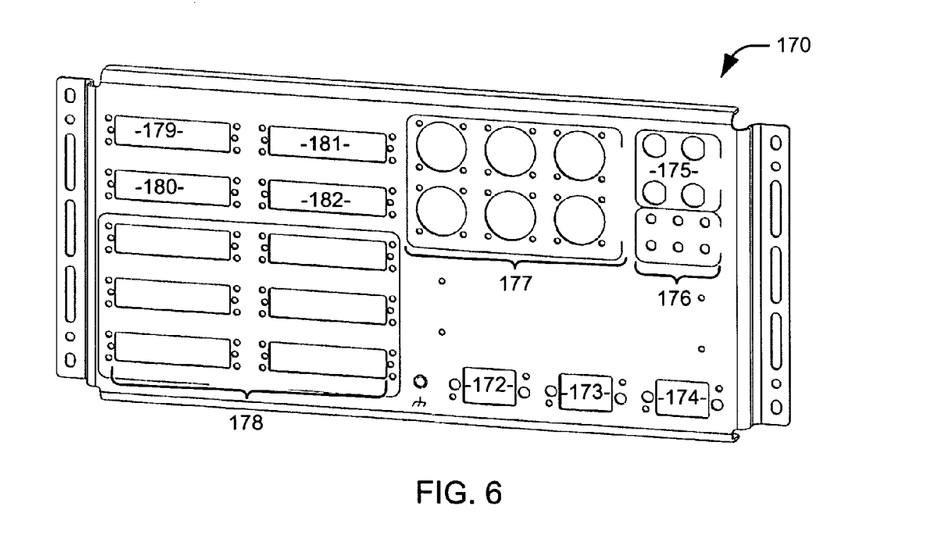
FIG. 6 illustrates an exemplary rack interface panel as might be utilized as part of a line replaceable equipment rack loaded with computer processing equipment in accordance with an aspect of the present invention.

FIG. 6 illustrates an exemplary rack interface panel 170, as might be as might be utilized as part of a line replaceable equipment rack (LRER), in accordance with an aspect of the present invention. It will be appreciated that one or more of these panels can be implemented on each of a set of one or more racks containing computer processing equipment for an aircraft mounted communications system. It will further be appreciated that a given aperture of the plurality of apertures 172-182 on the panel 170 can contain multiple ports, representing connectors for a plurality of electronics modules within the rack. Each of the apertures 172-182 and their corresponding ports correspond to similar structures on the intrabus interface panel 150 illustrated in FIG. 4, such that the intrabus interface panel 150 and the rack interface panel 170 allow for rapid connection of the rack to the intrabus during installation of a loaded rack.

The illustrated rack interface panel 170 includes a plurality of apertures 172-174 for receiving power for the electronic modules within a given rack. In the illustrated panel 170, the rack receives twenty-eight volts of direct current at one or more associated ports within a first aperture 172, one hundred fifteen volts of alternating current at sixty Hertz at one or more ports within a second aperture 173, and one hundred fifteen volts of alternating current at four hundred Hertz at one or more ports within a third aperture 174. One set of apertures 175 within the panel 170 provide MIL-1553 serial links to the rack. Another set of apertures 176 provide access to GPS (Global Positioning System) data at the rack, for example, from a navigation system onboard the aircraft, including both location data and accurate time of day information. A third set of apertures 177 provide 1000 base-T data links from the intrabus that can be utilized for sending data between the various racks at Gbit/s speeds. A fourth set of apertures 178 provide lower speed Ethernet links, such as 100 base-T and 10 base-T links. The panel 170 further includes an aperture 179 that provides one or more RS 422 links, another aperture 180 for a connection that conveys voice data, and a third aperture 181 reserved for one or more POTS (plain old telephone system) links. Finally, one or more spare apertures 182 can be provided, allowing for the addition of one or more additional ports from the various port types discussed herein or the inclusion of additional ports to perform other functions.

Figure 7:
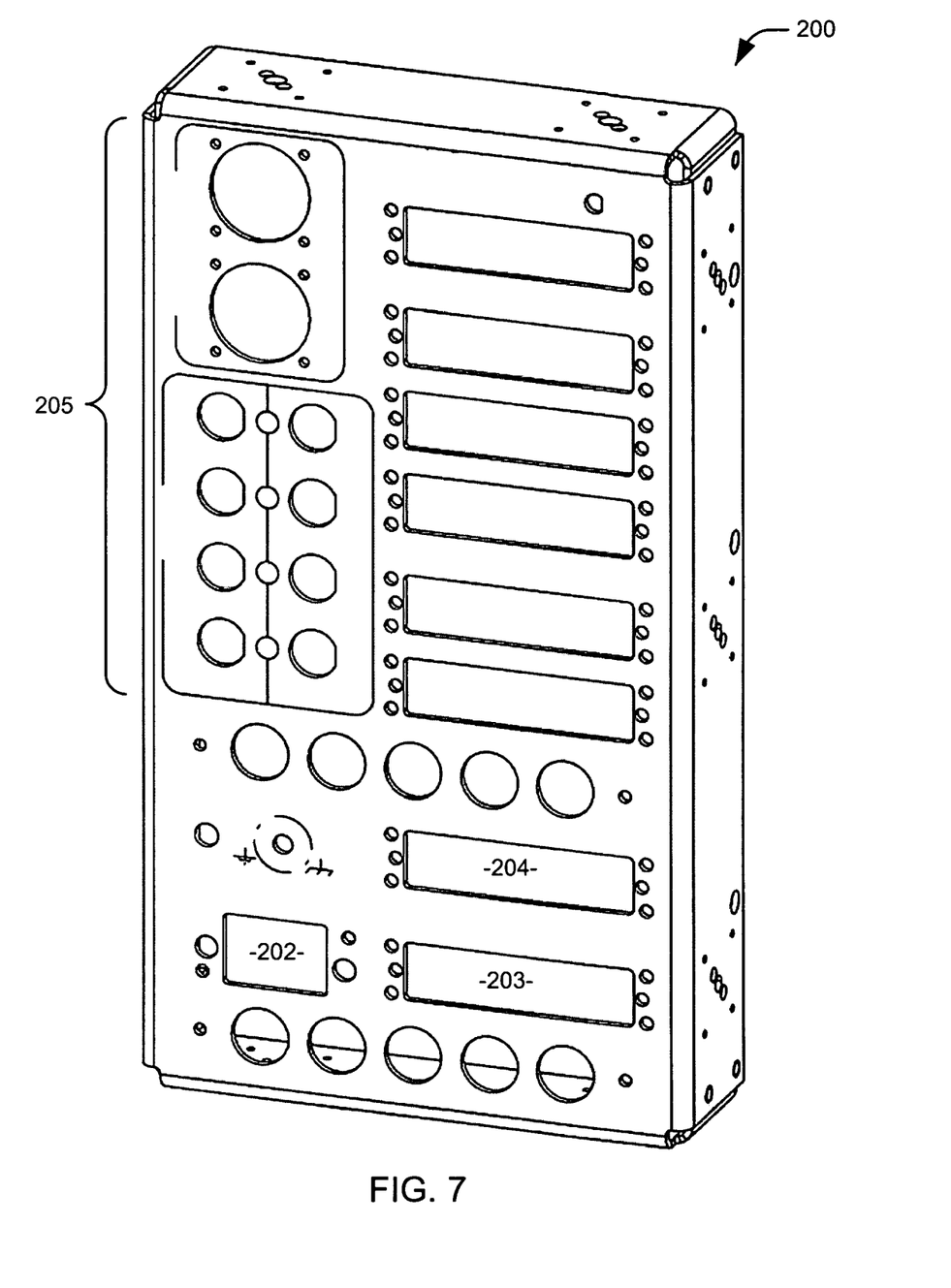
FIG. 7 illustrates an exemplary intrabus interface panel for a rack loaded with communications equipment in accordance with an aspect of the present invention.

FIG. 7 illustrates an exemplary intrabus interface panel 200, as might be utilized with a line replaceable equipment rack (LRER) loaded with radio communications equipment, in accordance with an aspect of the present invention. It will be appreciated that a number of these panels, for example, individual panels for various sets of data lines as well as a power panel, can be provided at each of a plurality of rack stations implemented within an aircraft, and that the configuration of the various panels can vary. It will further be appreciated that a given aperture of the plurality of apertures 202-205 on the panel 200 can contain multiple ports for connecting to different data links within the intrabus. The illustrated panel 200 includes a plurality of apertures 202-204 for accessing power ports that provide power to the electronic modules within a given rack. In the illustrated panel 200, a first aperture 202 allows access to one or more ports providing twenty-eight volts of direct current, a second aperture 203 that allows access to one or more ports providing one hundred fifteen volts of alternating current at sixty Hertz, and a third aperture 204 that allows access to one or more ports providing one hundred fifteen volts of alternating current at four hundred Hertz. A plurality of additional apertures 205 can allow access to various data links in the intrabus for carrying communications data. For example, the intrabus can include Ethernet connections of various speeds, RS-422 connections, MIL-1553 serial connections, and data links configured for conveying voice data.

Figure 8:
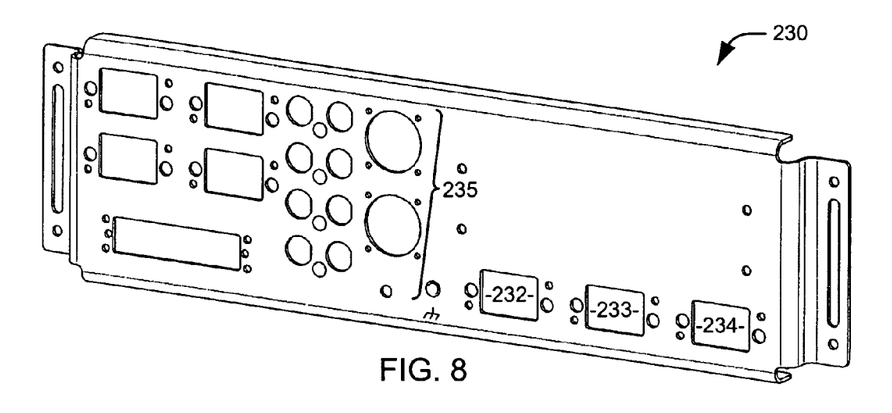
FIG. 8 illustrates an exemplary rack interface panel as might be utilized as part of a line replaceable equipment rack loaded with communications equipment in accordance with an aspect of the present invention.

FIG. 8 illustrates an exemplary rack interface panel 230, as might be utilized as part of a line replaceable equipment rack loaded with radio communications equipment, in accordance with an aspect of the present invention. It will be appreciated that one or more of these panels can be implemented on each of a set of one or more racks containing computer processing equipment for an aircraft mounted communications system. It will further be appreciated that a given aperture of the plurality of apertures 232-235 on the panel 230 can contain multiple ports, representing connectors for a plurality of electronics modules within the rack. The apertures 232-235 and their corresponding ports correspond to similar structures on the intrabus interface panel 200 illustrated in FIG. 6, such that the intrabus interface panel 200 and the rack interface panel 230 allow for rapid connection of the rack to the intrabus during installation of a loaded rack.

The illustrated rack interface panel 230 includes a plurality of apertures 232-234 for receiving power for the electronic modules within a given rack. In the illustrated panel 230, the rack receives twenty-eight volts of direct current at one or more associated ports within a first aperture 232, one hundred fifteen volts of alternating current at sixty Hertz at one or more ports within a second aperture 233, and one hundred fifteen volts of alternating current at four hundred Hertz at one or more ports within a third aperture 234. A plurality of additional apertures 235 can contain ports for receiving communications data at the rack. For example, the ports can include ports for receiving Ethernet connections of various speeds, RS-422 connections, MIL-1553 serial connections, and voice data.

Figure 9:
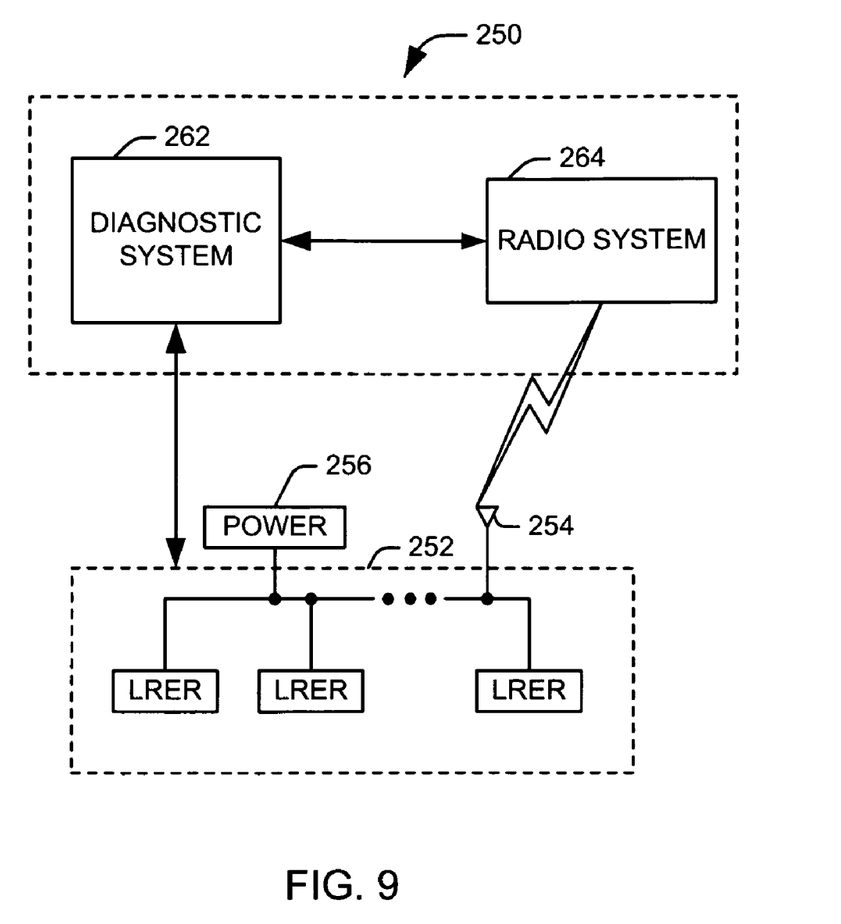
FIG. 9 illustrates an exemplary testing assembly for testing a communications system in accordance with an aspect of the present invention.

FIG. 9 illustrates an exemplary testing assembly 250 for testing a communications system 252 in accordance with an aspect of the present invention. In the illustrated implementation, the tested communications system 252 can include a system such as the system 70 illustrated in FIG. 3 assembled at a testing location external to an aircraft. It will be appreciated that while the illustrated testing assembly 250 is testing a complete communications system 252, additional testing assemblies can be provided for testing the individual components of the communications system, including individual line replaceable equipment racks (LRERs), interbus assemblies, and power distribution units, prior to testing the entire system.

The testing location can be fitted with resources similar to that utilized within the aircraft, such as one or more antennae 254 and a power supply 256 to facilitate the function of the communications system. The testing assembly 250 can comprise a diagnostic system 262 that measures at least one parameter associated with the communications system 250. The diagnostic system 262 can be electrically connected to one or more components within the communications assembly, including one or more line replaceable equipment racks (LRERs) and an intrabus that interconnects the plurality of LRERs, as is appropriate to the measured parameters. For example, the diagnostic system 262 can include one or more voltmeters for measuring the voltage provided by power lines within an intrabus assembly or one or more LRERs within the communications system. Similarly, the diagnostic system 262 can comprise one or more components, for example, software programs executable on a general purpose computer, for measuring data rates within the intrabus. In addition, the diagnostic system 262 can access information stored within the communication system to determine if messages received at the system are routed and processed correctly.

The diagnostic system 262 can be coupled to a radio system 264 that is operative to send and receive messages to the communications system. Accordingly, various test messages containing known information can be broadcast to the communications system 252, and the response of the communications system to the provided system can be monitored. Similarly, messages generated at the communications system 252 can be captured at the radio system 264 for analysis at the diagnostic system 262. Accordingly, the communications system 252 can be tested in its assembled form prior to its assembly within the aircraft, providing significant savings in both production time and expense.

Figure 10:
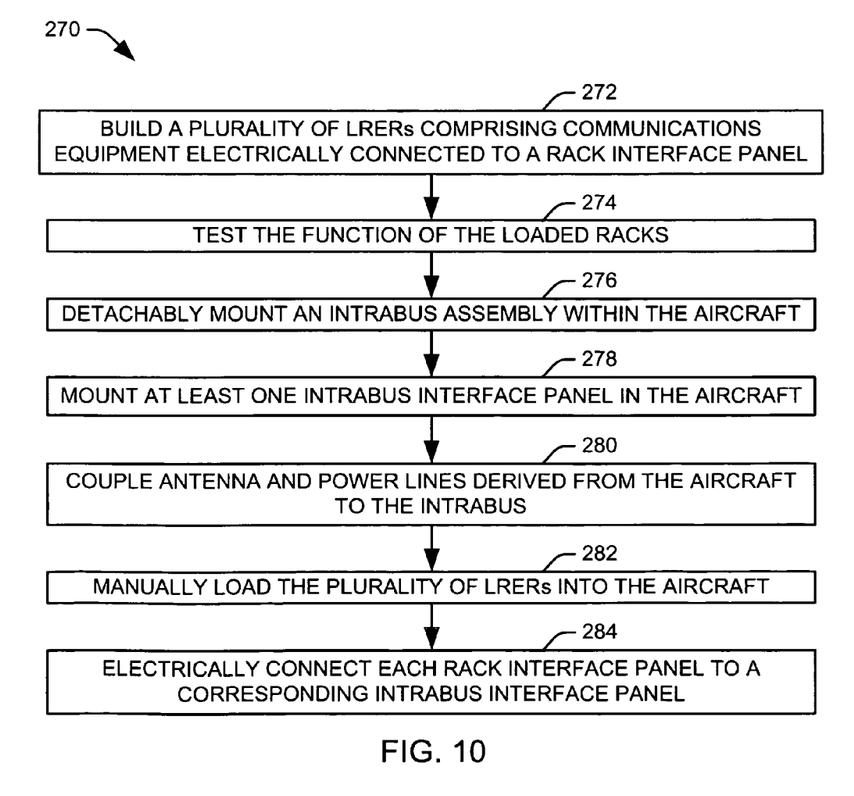
FIG. 10 illustrates a methodology for assembling a communications system onboard an aircraft from line replaceable equipment racks (LRERs) in accordance with an aspect of the present invention.

In view of the foregoing structural and functional features described above, methodologies in accordance with various aspects of the present invention will be better appreciated with reference to FIG. 10. While, for purposes of simplicity of explanation, the methodologies of FIG. 10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 10 illustrates a methodology 270 for assembling a communications system onboard an aircraft from line replaceable equipment racks (LRERs) in accordance with an aspect of the present invention. The methodology 270 begins at 272 where a plurality of line replaceable equipment racks are built. Each of the line replaceable equipment racks are loaded with communications equipment. For example, the communication equipment can be provided to the rack in the form of discrete electronics modules. These modules can be detachably affixed to the rack to secure the communications equipment within the rack. The communications equipment can then be operatively connected to a rack interface panel associated with the rack. Accordingly, each of the electronics modules inside of the rack are connected to one or more ports on the rack interface panel, such that operative data and power connections can be made with the various models comprising the rack at the panel.

At step 274, the LRERs are tested to ensure that they are functioning correctly. Any of a plurality of testing methodologies can be utilized to ensure the proper function of the LRERs, and it will be appreciated that LRERs having different types of communication equipment can be tested with different methodologies. In one implementation, a prestaging process is utilized for testing at least one of the plurality of racks. It will be appreciated that the LRERs can be tested either individually or as a communications system connected by an intrabus prior to mounting any components of the communications system onboard the aircraft. At 276, an intrabus assembly is detachably mounted within an aircraft. For example, the intrabus assembly can be mounted along the bulkhead. It will be appreciated that the intrabus assembly can include multiple, electrically isolated intrabuses for maintaining subsystems of differing security levels within the system. At 278, a plurality of intrabus interface panels are mounted within the aircraft. In one implementation, the plurality of intrabus interface panels are mounted at various positions on the bulkhead to facilitate access to the panels, and correspondingly, the intrabus assembly. Each of a plurality of communication and power lines within the intrabus assembly can be operatively connected to one or more ports in the intrabus interface panels to allow for a simplified connection of electronics equipment to the intrabus. The intrabus assembly can be operatively connected to the plurality of intrabus interface panels either onboard the aircraft or prior to the mounting of the intrabus and the intrabus interface panels within the aircraft.

At 280, antenna and power lines derived from the aircraft can be operatively connected to the intrabus to provide access to at least one power distribution unit and one or more antennae associated with the aircraft through the intrabus. Where multiple, electrically isolated intrabuses are utilized, the power and antenna lines can be connected to each intrabus. At 282, the plurality of LRERs are manually loaded into the aircraft. Each rack can be detachably mounted with appropriate mounting means in a position proximate to one or more intrabus interface panels. At 284, each rack interface panel is electrically connected to an associated intrabus interface panel. For example, the panels can be connected with appropriate cabling. With this connection, each of the electronics modules in the plurality of racks is operatively connected through the intrabus to one or more other electronics modules located in other racks and, optionally, a power source within the aircraft and an antenna associated with the aircraft, allowing the racks to function as an integrated communications system.

What has been described above includes exemplary implementations of the present invention. It is not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A communication system assembled on an aircraft, the system comprising:
    an intrabus detachably coupled mounted within the aircraft, the intrabus comprising communication lines and power lines;
    at least one intrabus interface panel that provides access to the intrabus;
    a plurality of line replaceable equipment racks (LRERs), each LRER being preassembled prior to being loaded onto the aircraft and comprising electronic equipment affixed within the LRER and at least one rack interface panel that provides access to the electronic equipment; and
    a plurality of cables that couple the at least one rack interface panel of each LRER to the at least one bus interface panel;
    wherein the intrabus comprises a first intrabus having a first level of security and a first intrabus interface panel, and a second intrabus having a second level of security and a second intrabus interface panel, wherein a security level of each LRER of the plurality of LRERs is assigned based on a coupling of the rack interface panel of a given LRER of the plurality of LRERs to one of the first intrabus interface panel and the second intrabus interface panel, wherein the first and second security levels are different security levels.

2. The system of claim 1, further comprising a power distribution unit that receives and distributes power from a power distribution unit of the aircraft to the intrabus, such that power can be provided to the electronic equipment at each of the plurality of LRERs through the intrabus.

3. The system of claim 1, wherein at least one of the plurality of LRERs further comprises a mounting element that releasably engages with an L-bracket mounted on the floor of the aircraft.

4. The system of claim 1, wherein the intrabus is detachably mounted to a bulkhead of the aircraft and is coupled to antenna lines and power lines derived from the aircraft.

5. The system of claim 1, wherein the first intrabus and the second intrabus have different dedicated communication lines and power lines.

6. The system of claim 1, wherein the plurality of LRERs comprises a computer LRER station, a server data storage LRER and at least one radio LRER station.

7. The system of claim 6, wherein the at least one intrabus interface panel comprises an intrabus computer interface panel and an intrabus radio interface panel and the computer LRER has a computer rack interface panel configured to interface with the intrabus computer interface panel and the at least one radio LRER has a radio rack interface panel configured to interface to the intrabus radio interface panel.

8. The system of claim 1, wherein each of the plurality of LRERs are pretested prior to being loaded on the aircraft.

9. The system of claim 1, wherein the intrabus and the at least one cable are preassembled and pretested prior to being loaded on the aircraft.

10. The system of claim 1, wherein the communication lines comprise control lines, data lines, voice lines and antenna lines.

11. The system of claim 1, wherein the at least one intrabus interface panel comprises a plurality of intrabus interface panels distributed at different locations on a bulkhead of the aircraft.

12. A communication system assembled on an aircraft, the system comprising:
    a first intrabus detachably mounted within the aircraft, the first intrabus comprising a first set of communication lines and a first set of power lines;
    a first intrabus interface panel that provides access to the first intrabus;
    a second intrabus detachably mounted within the aircraft, the second intrabus comprising a second set of communication lines and a second set of power lines;
    a second intrabus interface panel that provides access to the second intrabus;
    a plurality of line replaceable equipment racks (LRERs), each LRER being preassembled prior to being loaded onto the aircraft and comprising electronic equipment affixed within the LRER and at least one rack interface panel that provides access to the electronic equipment; and
    a plurality of cables that couple the at least one rack interface panel of each LRER to one of the first intrabus interface panel and the second intrabus interface panel;
    wherein the first intrabus has a first level of security and the second intrabus has a second level of security, wherein a security level of each LRER of the plurality of LRERs is assigned based on a coupling of the rack interface panel of a given LRER of the plurality of LRERs to one of the first intrabus interface panel and the second intrabus interface panel, wherein the first and second security levels are different security levels.

13. The system of claim 12, further comprising a power distribution unit that receives and distributes power from a power distribution unit of the aircraft to the first intrabus and the second intrabus, such that the power of the first intrabus and second intrabus are isolated from one another.

14. The system of claim 12, wherein the first intrabus is detachably mounted to a floor of a bulkhead of the aircraft and the second intrabus is detachably mounted to a mid-cabin wall of the bulkhead of the aircraft.

15. The system of claim 12, wherein the plurality of LRERs comprises a first computer LRER and a first radio coupled to the first intrabus and a second computer LRER and a second radio coupled to the second intrabus.

16. The system of claim 12, wherein each of the plurality of LRERs are pretested prior to being loaded on the aircraft.

17. The system of claim 12, wherein the first intrabus, the second intrabus and the plurality of cables are preassembled and pretested prior to being loaded on the aircraft.

18. A method of providing a communication system on an aircraft, the method comprising:

building a plurality of line replaceable equipment racks (LRERs), each LRER comprising electronic equipment affixed within the LRER and at least one rack interface panel that provides access to the electronic equipment;
detachably mounting a first intrabus having a first level of security within the aircraft, the first intrabus comprising:
an intrabus interface panel;
communication lines; and
power lines;
detachably mounting a second intrabus having a second level of security within the aircraft, the second intrabus comprising:
an intrabus interface panel;
communication lines; and
power lines;
coupling antenna lines and power lines derived from the aircraft to the first intrabus and the second intrabus;
manually loading the plurality of LRERs onto the aircraft;
electrically connecting each rack interface panel of each of the plurality of LRERs to an intrabus interface panel of one of the first intrabus and the second intrabus; and
assigning a security level of to each of the plurality of LRERs based on the electrically connecting, wherein the first and second security levels are different security levels.

19. The method of claim 18, further comprising testing each of the plurality of LRERs prior to manually loading the plurality of LRERs onto the aircraft.

20. The method of claim 18, further comprising testing the communication system prior to the detachably mounting an intrabus within the aircraft and the manual loading of the plurality of LRERs onto the aircraft.

21. The system of claim 1, wherein each of the plurality of LRERs further comprises a plurality of handles to facilitate carrying of a given LRER of the plurality of LRERs.

* * * * *